(12) United States Patent
Tsujimoto et al.

(10) Patent No.: US 6,613,172 B1
(45) Date of Patent: Sep. 2, 2003

(54) PROCESS FOR PRODUCING FOAMABLE COMPOSITE POLYOLEFIN RESIN SHEET AND COMPOSITE FOAM

(75) Inventors: Michitaka Tsujimoto, Kyoto (JP); Takamasa Fukuoka, Kyoto (JP); Hiroyuki Kurio, Kyoto (JP); Masashi Okabe, Kyoto (JP)

(73) Assignee: Sekisui Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/463,959

(22) PCT Filed: Jun. 10, 1998

(86) PCT No.: PCT/JP98/02554
§ 371 (c)(1),
(2), (4) Date: Feb. 10, 2000

(87) PCT Pub. No.: WO99/21693
PCT Pub. Date: May 6, 1999

(30) Foreign Application Priority Data

Oct. 29, 1997 (JP) ............................................. 9-297332
Feb. 9, 1998 (JP) ........................................... 10-027285
Feb. 10, 1998 (JP) ........................................... 10-028590

(51) Int. Cl.[7] ........................... B32B 5/20; B29C 47/02; C08J 9/06; C08J 3/24
(52) U.S. Cl. ..................... 156/78; 156/79; 156/244.11; 264/45.1; 264/51
(58) Field of Search ..................... 156/78, 79, 244.11; 264/45.1, 51

(56) References Cited

U.S. PATENT DOCUMENTS

| | | | |
|---|---|---|---|
| 4,399,087 A | * 8/1983 | Akiyama et al. | ............. 264/53 |
| 5,318,649 A | 6/1994 | Nishino et al. | |
| 5,552,482 A | * 9/1996 | Berta | .......................... 525/193 |
| 5,589,519 A | * 12/1996 | Knaus | .......................... 264/50 |
| 5,883,145 A | * 3/1999 | Hurley et al. | ............... 521/144 |

FOREIGN PATENT DOCUMENTS

| | | |
|---|---|---|
| EP | 434 411 | 6/1991 |
| EP | 488 762 | 6/1992 |
| GB | 1208403 | * 10/1970 |
| GB | 1251973 | 11/1971 |
| JP | 05-070621 | 3/1993 |
| JP | 5070621 | 3/1993 |
| JP | 09-150431 | 6/1997 |

OTHER PUBLICATIONS

Derwent English translation of JP 5–70621–A, Mar. 1993, pp 1–35.*

* cited by examiner

Primary Examiner—Sam Chuan Yao
(74) Attorney, Agent, or Firm—Rader Fishman & Grauer PLLC

(57) ABSTRACT

An object of the present invention is to provide a composite foam having a high compressive strength. A polyolefin resin is melted and kneaded with a modifying monomer to react them. A thermally decomposable chemical foaming agent is added to the obtained modified resin, and the mixture is kneaded. The obtained foamable resin composition is shaped into a sheet. A sheet-like facing material (3) having a strength sufficient to inhibit the foamable sheet from expanding in in-plane directions during thermal foaming is laminated on at least one side of the foamable sheet. The obtained foamable composite sheet is thermally foamed to produce a composite foam (1) having rugby-ball-shaped cells (2) oriented in the direction of the sheet thickness.

11 Claims, 1 Drawing Sheet

PROCESS FOR PRODUCING FOAMABLE COMPOSITE POLYOLEFIN RESIN SHEET AND COMPOSITE FOAM

TECHNICAL FIELD

The present invention relates to a process for producing a foamable composite sheet mainly made of a polyolefin resin and to a composite foam obtained from this foamable composite sheet.

BACKGROUND ART

Since polyolefin resin foams made of polyethylene, polypropylene or the like are excellent in lightweight, thermal insulating properties, flexibility, and the like, the foams are widely used for various thermal insulators, cushioning materials, floating materials, etc. However, the polyolefin resin foams can not be used for, for example, roof thermal insulators and floor thermal insulators of buildings, since the polyolefin resin foams have a lower compressive strength than that of polystyrene resin foams.

In order to solve this problem, for example, Japanese Laid-open Patent Publication No. 150431/1997 proposes a foamable composite wherein a sheet-like facing material is laminated on at least one side of a foamable polyolefin resin sheet containing a thermally decomposable foaming agent, and the facing material has a strength sufficient to inhibit the foamable sheet from expanding in in-plane directions during foaming by heating.

In practice, the polyolefin resin is blended with a silane-modified polyolefin being incompatible with the resin, a thermally decomposable chemical foaming agent is added to the blend, the mixture is kneaded, the obtained foamable resin composition is shaped into a sheet, sheet-like facing materials made of polyethylene terephthalate non-woven fabric are simultaneously laminated on both sides of the obtained foamable sheet, the silane-modified polyolefin in the obtained foamable composite sheet is water crosslinked, and the sheet is foamed by heating to give the composite foam.

The obtained foamable resin sheet hardly expands in two-dimensional directions in the plane and expands only in a direction of thickness, since the sheet-like facing material having the strength capable of inhibiting expanding in the in-plane directions on foaming is laminated on at least one side of the foamable resin sheet. Accordingly, cells of the foam are arranged in the form of spindles of which major axis is oriented in the direction of the thickness, just like upright rugby balls oriented in the direction of the sheet thickness (see FIG. 1). When the foam is compressed with compressive force in the direction of the sheet thickness, the force acts to the foam in a direction of a major axis of the spindle. Consequently, the obtained foam exhibits a high strength in the direction of the sheet thickness.

However, the above-mentioned prior art has the following problems.

The silane-modified polyolefin is expensive.

Since it takes a long period of time (usually one hour or longer) to carry out the crosslinking reaction, the foam cannot continuously be produced.

Some sheet-like facing materials are unsuitable for hot water immersion in the crosslinking.

Since the foamable composite sheet gets wet in the crosslinking reaction, drying process is required.

Since the foamable composite sheet is crosslinked, spindle-shaped cells having a high axis ratio (length of major axis/length of minor axis) cannot be produced.

Since blowing pressure is high, a sheet-like facing material having a low strength cannot be used.

Since the obtained foam is crosslinked, it cannot be recycled.

A foam made of polypropylene alone, which has high heat-resisting properties and mechanical physical properties, cannot be produced. Since the foam generally comprises a blend of polypropylene with polyethylene, the above-mentioned performances deteriorate.

Objects of the present invention are to solve the above-mentioned problems and to provide a composite foam having excellent properties and a process for producing a foamable composite sheet to obtain the foam.

DISCLOSURE OF THE INVENTION

A process for producing a foamable composite polyolefin resin sheet according to the present invention is characterized by reacting a polyolefin resin with a modifying monomer to modify the resin, adding a thermally decomposable chemical foaming agent to the obtained modified resin, kneading the obtained mixture, shaping the obtained foamable resin composition into a sheet, and laminating a sheet-like facing material on at least one side of the obtained foamable sheet, the facing material having a strength sufficient to inhibit the foamable sheet from expanding in in-plane directions during foaming by heating the foamable sheet.

Throughout the present specification, the "in-plane directions" mean any directions on the surface of the foamable sheet and include a lengthwise direction and a width direction. The "sheet" does not mean a form in the strict sense of the word on the basis of thickness but includes from relatively thin matter usually called film to relatively thick matter usually called plate material.

A composite foam can be obtained by thermally foaming the foamable composite polyolefin resin sheet obtained by the process of the present invention.

Polyolefin which is a main constituent of the polyolefin resin in the process of the present invention can be a homopolymer of an olefin monomer or a copolymer of the olefin monomer which is a main component with the other monomer(s), and the polyolefin is not particularly limited. Examples of the polyolefin are polyethylene such as low-density polyethylene, high-density polyethylene or linear low-density polyethylene; polypropylene such as homo type polypropylene, random type polypropylene or block type polypropylene; polybutene; copolymers mainly composed of ethylene such as an ethylene-propylene copolymer, an ethylene-propylene-diene terpolymer, an ethylene-butene copolymer, an ethylene-vinyl acetate copolymer and an ethylene-(meth)acrylate copolymer. They can also be used in combination.

The polyolefin which is the main constituent of the polyolefin resin in the process of the present invention is preferably one of the above-mentioned polyethylene and polypropylene or a combination thereof.

The polyolefin resin means a resin composition of which proportion of the above-mentioned polyolefin is 70 to 100% by weight. The other resin constituting the polyolefin resin than the polyolefin is not limited. Examples of the other resin are polystyrene, a styrene elastmer, etc. If the proportion of the polyolefin in the polyolefin resin is lower than 70% by weight, the resin cannot exhibit lightweight, chemical resistance, flexibility, elasticity, and the like which are characteristics of the polyolefin, and it is sometimes difficult to insure melting viscosity required for foaming. Accordingly, such a proportion is not preferable.

The modifying monomer to be used in the process of the present invention is a compound having two or more functional groups which can undergo radical reaction in its molecule. Examples of the above-mentioned functional group are an oxime group, a maleimide group, a vinyl group, an allyl group, a (meth)acryl group, etc. The modifying monomer is preferably a dioxime compound, a bismaleimide compound, divinylbenzene, an allylic polyfunctional monomer and a (meth)acrylic polyfunctional monomer. The modifying monomer can also be a cyclic compound having two or more ketone groups in its molecule such as a quinone compound.

Among the modifying monomers to be used in the process of the present invention, a compound having two oxime groups in its molecule, i.e. a dioxime compound, can be a compound having two oxime groups (formula I) or two structures wherein a hydrogen atom of the oxime group is replaced with other atomic group (mainly a hydrocarbon group) (formula II) in its molecule as represented by the following general formulae. Examples of the compound are p-quinonedioxime (formula III) and p,p-dibenzoylquinonedioxime (formula IV). The dioxime compounds can also be used in combination.

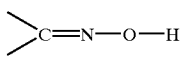
(I)

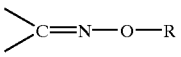
(II)

(III)

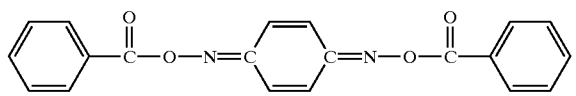
(IV)

Among the modifying monomers to be used in the process of the present invention, examples of the bismaleimide compound having two maleimide structures (formula V) represented by the following general formula in its molecule are N,N'-p-phenylenebismaleimide (formula VI), N,N'-m-phenylenebismaleimide (formula VII) and diphenylmethanebismaleimide (formula VIII). The bismaleimide compounds can also be used in combination. Since polymaleimide (formula IX) having two or more maleimide structures in its molecule also exhibits similar effects, it comes within the category of the bismaleimide compound.

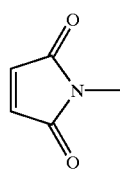
(V)

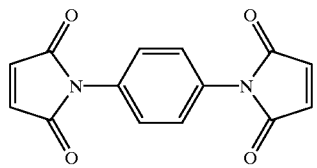
(VI)

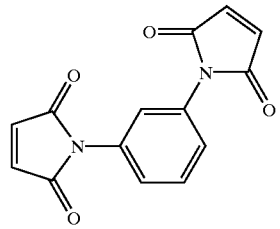
(VII)

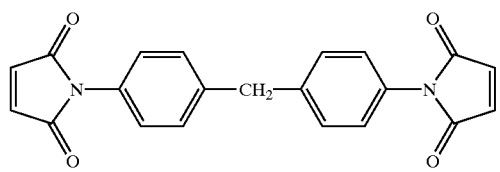
(VIII)

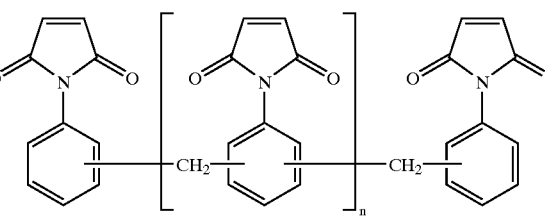
(IX)

Among the modifying monomers to be used in the process of the present invention, a compound having two vinyl groups in its molecule, i.e. a divinyl compound, is exemplified by divinylbenzene (compound X) represented by the following formula. The two vinyl groups can have any positional relations of ortho, meta and para.

$$\underset{\underset{CH=CH_2}{\bigcirc}}{CH=CH_2}$$
(X)

Among the modifying monomers to be used in the process of the present invention, examples of a compound having two or more allyl groups, i.e. an allylic polyfunctional monomer, are diallyl phthalate (formula XI), triallyl cyanurate (formula XII), triallyl isocyanurate (formula XIII) and diallyl chlorendate (formula XIV) represented by the following formulae. The allylic polyfunctional monomers can also be used in combination.

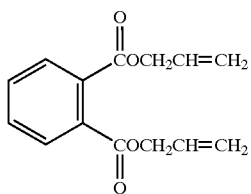
(XI)

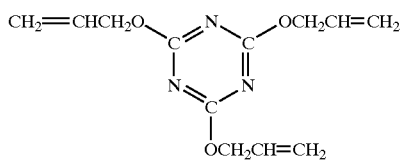
(XII)

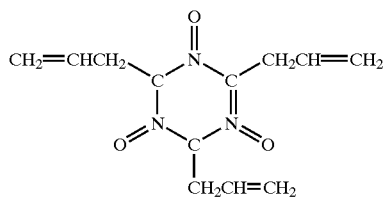
(XIII)

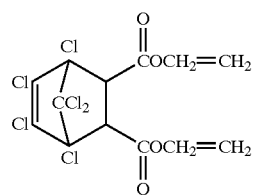
(XIV)

Among the modifying monomer to be used in the process of the present invention, compounds having two to four (meth)acryloyloxy groups are given as the compound having two or more (meth)acryl groups in its molecule, that is, the (meth)acrylic polyfunctional monomer.

Examples of a (meth)acrylic bifunctional monomer having two (meth)acryloyloxy groups are alkanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, dimethylol tricyclodecane di(meth)acrylate, bisphenol A-ethylene glycol adduct di(meth)acrylate and bisphenol A-propylene glycol adduct di(meth)acrylate.

Examples of a (meth)acrylic trifunctional monomer having three (meth)acryloyloxy groups are trimethylolpropane tri(meth)acrylate, pentaerythritol tri(meth)acrylate, trimethylolpropane-ethylene oxide adduct tri(meth)acrylate, glycerin-propylene oxide adduct tri(meth)acrylate and tris (meth)acryloyloxy ethylphosphate.

Examples of a (meth)acrylic tetrafunctional monomer having four (meth)acryloyloxy groups are pentaerythrytol tetra(meth)acrylate and ditrimethylolpropane tetra(meth)acrylate.

Among the modifying monomers to be used in the process of the present invention, typical examples of the cyclic compound having two or more ketone groups in its molecule are the quinone compounds. Examples of the quinone compounds are hydroquinone, p-benzoquinone and tetrachloro-p-benzoquinone.

An amount of the modifying monomer can be appropriately selected depending on kinds of the monomer. The amount is generally 0.05 to 5 parts by weight, preferably 0.2 to 2 parts by weight per 100 parts by weight of the polyolefin resin. When the amount of the modifying monomer is less than 0.05 part by weight, it is difficult to obtain melting viscosity required for foaming. When the amount is more than 5 parts by weight, a degree of crosslinking becomes too high, and extrusion properties become bad (for example, loading becomes high, and melt fracture occurs). Furthermore, since the foaming agent to be added later cannot be kneaded uniformly in the resin composition, a gel fraction unnecessarily becomes too high, and recycling properties are sometimes impaired. In addition, blowing pressure in thermal foaming becomes too high later, and the sheet-like facing material having a low tensile strength sometimes cannot inhibit the foamable sheet from expanding in the in-plane directions.

An organic peroxide can be used together with the modifying monomer in the process of the present invention. In particular, when divinylbenzene or the allylic polyfunctional monomer is used as the modifying monomer, it is preferable to use the monomer together with the organic peroxide. The organic peroxide can be an appropriate compound which is generally used for graft reaction of polyolefins. Examples of the organic peroxide are benzoyl peroxide, 2,4-dichlorobenzoyl peroxide, t-butylperoxy acetate, t-butylperoxy benzoate, dicumyl peroxide, 2,5-dimethyl-2,5-di(t-butylperoxy)hexane, di-t-butylperoxide, 2,5-dimethyl-2,5-di(t-butylperoxy)hexyne-3, etc. These can be used individually or in combination.

In particular, one or at least two of dicumyl peroxide, 2,5-dimethyl-2,5-di(t-butylperoxy)hexane, di-t-butylperoxide, 2,5-dimethyl-2,5-di(t-butylperoxy)hexyne-3 and the like are used more preferably.

When an amount of the organic peroxide to be used is too little, conversion of graft reaction is insufficient. When the amount is too much, so-called β-fission of polypropylene occurs remarkably, which sometimes leads to drops in physical properties due to too low molecular weight of the modified product, or poor foaming due to a drop in viscosity. In view of these points, the amount of the organic peroxide is preferably 0.001 to 0.5 part by weight, more preferably 0.005 to 0.15 part by weight per 100 parts by weight of the polyolefin resin.

In order to obtain the modified resin, the polyolefin. resin is melted and kneaded with the modifying monomer under the prescribed condition using a kneading apparatus such as a screw extruder or a kneader to react them. In the process, the reaction temperature is between 170° C. and a decomposition temperature of the polyolefin resin, preferably 200° to 250° C. When the reaction temperature is lower than 170° C., the modification is insufficient, and an expansion ratio of the foam finally obtained sometimes does not increase sufficiently. When the temperature is higher than 250° C., the polyolefin resin is apt to decompose.

The apparatus to be used for the above-mentioned modification can be, in addition to the screw extruder, a melting and kneading apparatus which can generally be used for extruding plastics. Examples of the apparatus are kneaders, rotors, continuous kneaders, etc. Among them, the screw extruders which can be operated continuously are preferable. Single screw extruders, twin screw extruders, multi-screw extruders equipped with at least three screws are preferably used. Examples of the single screw extruders are those having a ordinary full-flight screw and further include those having a discontinuous flight screw, pin barrel and mixing head. Examples of the twin screw extruders which are suitable to use are those having intermeshing co-rotating screws or counter rotating screws and those having non-intermeshing counter rotating screws. It is effective to provide a vacuum vent at the rear of the extruder in order to prevent volatile matter from remaining in the resin composition.

When the screw extruder is used, the polyolefin resin is usually charged from a hopper into the extruder. It is also preferable to use a helical screw feeder, a weight controlling feeder and the like to keep a feed of the resin constant.

The modifying monomer can be charged from the hopper into the extruder together with the polyolefin resin. Divinylbenzene and some of the allylic polyfunctional monomers are liquid at normal temperatures and pressures. Accordingly, it is preferable to supply such a liquid monomer through a liquid injection port provided in the extruder downstream from a position where the polyolefin resin is melted so as to disperse the monomer uniformly in the molten resin. It is desirable to send the liquid monomer with a compression pump such as a plunger pump at this time.

When the organic peroxide is used together with the modifying monomer, it is possible to apply a method of mixing the organic peroxide with the monomer in advance and charging them into the extruder simultaneously or a method of charging the organic peroxide individually before or after charging the monomer.

The modified resin can be melted and blended with an unmodified polyolefin resin of the same or different kind. By using such a blend of the modified resin with the unmodified resin, flowability of the resulting foamable resin composition is improved, thereby a very thin foamable composite sheet can be obtained, and a thin sheet-like composite foam can be produced. In addition, by improving the flowability of the foamable resin composition, spindle-shaped cells are suitably formed. Consequently, a foam having a higher compressive strength can be obtained.

The unmodified polyolefin resin can be the resin described previously in the definition of the polyolefin resin before the modification.

The unmodified polyolefin resin is appropriately selected depending on moldability, appearance and adhesion properties to a sheet-like facing material of the obtained foamable composite sheet, and an expansion ratio, mechanical physical properties, thermal physical properties and cell shapes of the composite foam obtained from the foamable composite sheet. For example, if flowability of the foamable composite sheet is desired to be increased, a low-viscosity resin is used as the unmodified polyolefin resin. If a soft foam is desired to be obtained, a low-density resin is used as the unmodified resin.

Regarding a ratio of the modified resin and the unmodified polyolefin resin, preferably 50 to 200 parts by weight, more preferably 70 t o 130 parts by weight of the unmodified resin are blended with 100 parts by weight of the modified resin. When the ratio of the unmodified polyolefin resin is too high, melt tension required for foaming cannot be kept. Consequently, the expansion ratio decreases, and sometimes a good foam is not obtained.

A thermally decomposable chemical foaming agent to be used in the present invention is not particularly limited, so far as the foaming agent generates decomposition gases by h eating. Typical examples of the thermally decomposable chemical foaming agent are azodicarbonamide, benzenesulfonylhydrazide, dinitrosopentamethylenetetramine, toluenesulfonylhydrazide and 4,4-oxybis(benzenesulfonylhydrazide). These can be used individually or in combination. Particularly azodicarbonamide is suitably used among them.

The thermally decomposable chemical foaming agent is used in an appropriate amount in the range of 1 to 50 parts by weight, preferably in the range of 2 to 35 parts by weight per 100 parts by weight of the modified resin depending on the desired expansion ratio.

Thus, in order to knead the thermally decomposable chemical foaming agent with the modified resin obtained from the polyolefin resin and the modifying monomer to give the foamable resin composition, the modified resin and the foaming agent are mixed at a temperature lower than a maximum temperature not to decompose the foaming agent substantially, using the above-mentioned melting and kneading apparatus for reaction and another melting and kneading apparatus for incorporating the foaming agent (the structure of the latter apparatus can be the same as that of the former apparatus). Modes of the melting and kneading are as follows.

(a) In a batch-wise or continuous melting and kneading apparatus for reaction, the polyolefin resin is melted and kneaded with the modifying monomer to react them, the resulting modified resin is taken out from the apparatus, followed by solidification, granulation and the like. Then the resin composition is transferred to a batch-wise or continuous kneading apparatus for incorporating the foaming agent, the foaming agent is charged thereinto, and the resin composition and the foaming agent are melted and kneaded to give the foamable resin composition.

(b) In the batch-wise melting and kneading apparatus for reaction, the polyolefin resin is melted and kneaded with the modifying monomer to react them, the resulting modified resin is cooled to a temperature at which the foaming agent does not decompose substantially or in quantity in the apparatus, then the foaming agent is charged thereinto, and the modified resin and the foaming agent are melted and kneaded to give the foamable resin composition.

(c) In the screw extruder for reaction (continuous melting and kneading apparatus), the polyolefin resin is melted and kneaded with the modifying monomer at 170° C. or higher to react them, the resulting modified resin is cooled to a temperature at which the foaming agent does not decompose substantially or in quantity, the foaming agent is charged thereinto through a feed port provided in the middle of the screw extruder, and the modified resin and the foaming agent are melted and kneaded to give the foamable resin composition.

(d) In another mode of continuous operation, two screw extruders are combined, the polyolefin resin is melted and kneaded with the modifying monomer in the first screw extruder to react them, the resulting modified resin is cooled in the same manner as mentioned above, then the resin composition is transferred to the second screw extruder, the foaming agent is charged thereinto, and the resin composition and the foaming agent are melted and kneaded to give the foamable resin composition.

The foamable resin composition produced by kneading the mixture with the thermally decomposable chemical foaming agent is shaped into a sheet. It is possible to use methods carried out generally in fabrication of plastic such as press molding, blow molding, calendering method and injection molding in addition to extrusion method.

In particular, it is preferable in view of productivity to take out the foamable resin composition obtained according to the above-mentioned methods (a) and (b) from the batch-wise kneader for incorporating the foaming agent and to introduce the composition into the screw extruder to shape the composition into a sheet continuously, or to shape directly the foamable resin composition discharged from the screw extruder according to the above-mentioned methods (a), (c) and (d).

A raw material constituting the sheet-like facing material to be used in the present invention is selected among paper, cloth, wood, metals such as iron, non-ferrous metals, plastic, glass, inorganic matter, etc. and is not particularly limited. It is preferable that the facing material exhibits adhesion to the foamable sheet to some extent so that the sheet-like facing material may be combined with the foamable sheet. However, even if the sheet-like facing material has no adhesion, the facing material can be stick to the foamable sheet by use of a pressure-sensitive adhesive or an ordinary adhesive appropriately.

The sheet-like facing material has a strength which can inhibit the foamable sheet from expanding in in-plane directions during foaming by heating the foamable sheet. When the strength of the sheet-like facing material is too low, the sheet-like facing material is broken during the foaming, and it is sometimes impossible to inhibit the expanding in the in-plane directions of the foamable sheet. Accordingly, in order to inhibit such an expansion in-plane, the sheet-like facing material has a tensile strength of preferably 0.1 kgf/cm or higher, for example, when the expansion ratio is 10.

Examples of the sheet-like facing material to be used suitably in the process of the present invention are glass cloth, victoria lawn, woven fabric, non-woven fabric, needle punched non-woven fabric, paper, etc. The glass cloth means a woven product of surface mat and glass roving obtained by manufacturing glass fiber. The victoria lawn, the non-woven fabric and the needle punched are mainly made of synthetic fiber such as polyester or nylon. The woven fabric can be made of general natural fibers or synthetic fiber. The surface mat can contain a binder to combine glass short fibers each other. The binder is not particularly limited, so far as the tensile strength of the sheet-like facing material is within the above-mentioned range. Examples of the binder are thermoplastic resins such as polyvinyl alcohol, saturated polyester and an acrylic resin, and thermosetting resins such as an epoxy resin and unsaturated polyester. Examples of organic fiber constituting the woven fabric and the non-woven fabric are polyester fiber, cotton, acrylic fiber, nylon fiber, carbon fiber, aramid fiber, etc. A light polyolefin resin composite foam having a high compressive strength can be obtained by using these sheet-like facing materials. The foam can be postformed by reheating the foam at a melting point of the polyolefin resin or higher when using a sheet-like facing material having a suitable strength. Accordingly, the obtained composite foam can suitably be used for ceiling materials of automobiles, core materials of interior panels, etc.

The sheet-like facing material to be used in the process of the present invention can comprise a metallic sheet such as an iron sheet or a non-ferrous metallic sheet made of aluminum, titanium, copper or the like. The iron sheet contains molten zinc steel, molten zinc aluminum alloy steel, stainless steel, etc. Particularly, a rolled thin sheet having a thickness of 0.01 to 2 mm is suitably used as the metallic sheet-like facing material. These metals can optionally be plated or can be coated with organic or inorganic coatings, and a viscous adhesive can be applied to the metals. When these metallic sheet-like facing materials are used, a light metallic polyolefin resin composite board can be obtained. It has advantages that lightening and cost reduction can be attained without causing practical strength shortage, compared with a metallic plate having a thickness of 1 to 5 mm and a metallic composite board having a polyethylene layer or the like as an intermediate layer. Since the composite foam is produced by foaming the foamable composite sheet, the composite foam is excellent in surface smoothness compared with a metallic composite board wherein the metallic sheet-like facing material is afterward applied to the foam.

The method of laminating the sheet-like facing material on at least one side of the foamable sheet is not particularly limited. Examples of the method are (a) a method comprising applying the sheet-like facing material to the foamable sheet solidified by cooling once, while heating the facing material, (b) a method comprising heating the foamable sheet until it reaches a molten state and fusion bonding it to the sheet-like facing material, (c) a method comprising laminating the sheet-like facing material on the foamable sheet with an adhesive, etc.

In order to insure precision of thickness of the foamable composite sheet, the method (a) or (c) is preferable. In the fusion bonding in the method (b), it is preferable, for example, to laminate the sheet-like facing material lightly on at least one side of the foamable sheet in the molten state immediately after extrusion from a T die, to pass them between two opposite cooling rolls, and to combine them into one by roll pressure.

The above-mentioned combining of the foamable sheet with the sheet-like facing material by lamination means a state in which the sheet-like facing material is fixed hard to the foamable sheet to such an extent that material destruction occurs at a high rate when the former is tried to be separated from the latter at their interface.

The foamable composite sheet obtained in this way can be foamed in a desired expansion ratio under atmospheric pressures or a certain constant pressure by heating the composite sheet under a suitable temperature condition. The above-mentioned heating is usually carried out in the temperature ranging from decomposition temperature of the thermally decomposable chemical foaming agent to a temperature of the decomposition temperature plus 100° C. In particular, continuous foaming apparatus to be used are a belt foaming machine, a vertical or horizontal foam oven, a hot-air thermostatic chamber and hot baths such as an oil bath, a metal bath and a salt bath in addition to a take-off foaming machine which foams the foamable composite seat while taking off the foam at an outlet of a heating oven.

In order that the sheet-like facing material may make the foamable composite polyolefin resin sheet expand in the direction of the thickness positively while inhibit the sheet from expanding in the in-plane directions when the sheet is thermally foamed, the resin constituting the foamable sheet must have flowability. According to the process of the present invention, the modified resin obtained by kneading the polyolefin resin with the specific modifying monomer can have a melt strength enough to maintain melt flowability sufficiently capable of kneading the modified resin with the foaming agent and shaping the obtained composition into the sheet, then expanding the sheet in the direction of the thickness.

As shown in FIG. 1, since the sheet-like facing material (3) having a strength sufficient to inhibit the foamable sheet from expanding in the in-plane directions during thermal foaming is laminated on at least one side of the foamable sheet, the sheet hardly expands in two-dimensional directions in the plane but expands only in a direction of thickness during foaming. Accordingly, cells (2) of the composite foam (1) obtained by foaming by heating the foamable composite sheet are arranged in the form of spindles of which major axis is oriented in the direction of the thickness, just like upright rugby balls oriented in the direction of the sheet thickness. When the foam is compressed with compressive force in the direction of the sheet thickness, the force acts to the foam in a direction of a major axis of the spindle. Consequently, the obtained foam exhibits a high strength in the direction of the sheet thickness.

Since the foamable composite sheet obtained by the present invention has a lower blowing pressure compared with a foamable sheet obtained by using silane-modified polyolefin as a crosslinking material according to the prior art, expanding in the in-plane directions can be inhibited without damage, even if a sheet-like facing material having a very low strength, for example 0.3 kg/cm, is used. As a result, it is possible to expand only in the direction of the thickness and to obtain the foam comprising spindly cells having a major axis in the direction of the thickness by thermally foaming the foamable sheet.

Since flowability is further improved by blending the unmodified polyolefin resin or other thermoplastic resin with the modified resin and the blowing pressure further decreases, spindly cells having more distortion than spheres are apt to be formed.

The process of the present invention has a high productivity since water crosslinking, which requires long reaction time, is not used. Since the foamable composite resin sheet obtained by the present invention and the composite foam obtained from the sheet have melt flowability, they can substantially be recycled.

BEST MODE FOR CARRYING OUT THE INVENTION

Figure 1:
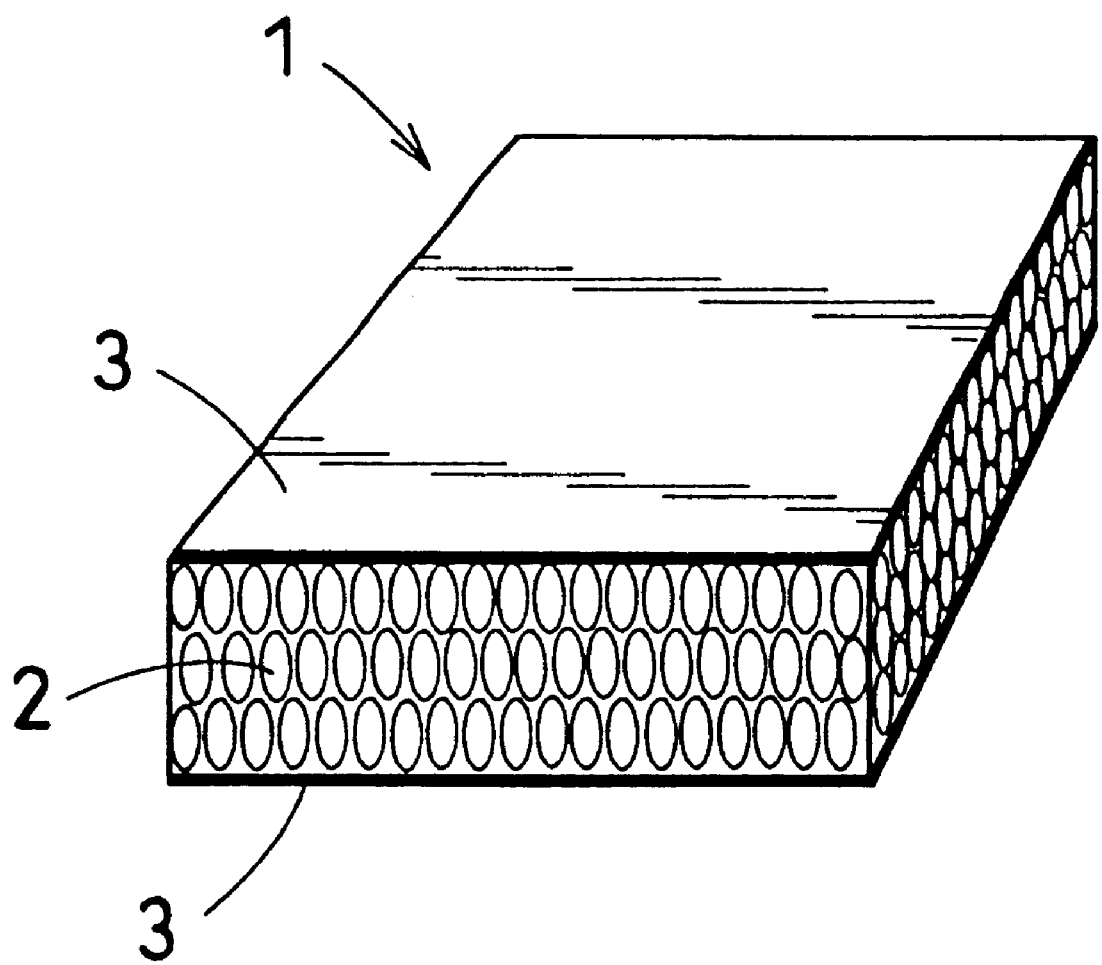
FIG. 1 is a schematic drawing of a composite foam.

The present invention is described in detail by the following Examples.

EXAMPLE 1 i) Production of Foamable Resin Composition
(1) Preparation of Modified Polyolefin Resin A BT40 (manufactured by Plastic Engineering Laboratory Co., Ltd.) co-rotating twin screw extruder was used as a screw extruder for reaction. This extruder is equipped with a self-wiping double-flighted screw, its L/D is 35, and D is 39 mm. A cylinder barrel comprises a first barrel to a fourth barrel as arranged downstream from the upstream end of the extruder. A die is a strand die having three bores. A vacuum vent is provided in the fourth barrel to recover volatile components.

Operating conditions are as follows.
Temperature set for cylinder barrels:
First barrel; 180° C.
Second barrel; 220° C.
Third barrel; 220° C.
Fourth barrel; 220° C.
Die; 220° C.
Rotation speed of screw: 150 rpm First, a polyolefin resin and a dioxime compound were separately charged thereinto through a rear hopper of the screw extruder for reaction having the above-mentioned constitution, and they were melted and kneaded to give a modified resin. The volatile components generating in the extruder were drawn in a vacuum through the vacuum vent.

The polyolefin resin used was a polypropylene random copolymer ("EG8" manufactured by Mitsubishi Chemical Industries, Ltd., MI; 0.8 g/10 minutes, density; 0.9 g/cm$^3$), and its feed rate was 10 kg/h.

A modifying monomer was p-quinonedioxime ("Barknock GM-P" manufactured by Ouchi Shinko Chemical Co., Ltd.), and its feed rate was 0.75 part by weight per 100 parts by weight of the polyolefin resin.

The modified resin obtained by melting and kneading the polyolefin resin with the dioxime compound was discharged from the strand die, water-cooled and cut with a pelletizer to give pellets of the modified resin.
(2) Preparation of Foamable Resin Composition A screw extruder for incorporating a foaming agent is a co-rotating twin screw extruder (Model "TEX-44" manufactured by Japan Steel Works, Ltd.). This extruder is equipped with a self-wiping double-flighted screw, its L/D is 45.5, and D is 47 mm. A cylinder barrel comprises a first barrel to a twelfth barrel as arranged downstream from the upstream end of the extruder. A die is a strand die having seven bores.

Temperature setting sections are as follows.

The first barrel is always cooled.

First zone; second to fourth barrels

Second zone; fifth to eighth barrels

Third zone; ninth to twelfth barrels

Fourth zone; die and adapter part

A side feeder is provided in a sixth barrel in order to supply a foaming agent, and a vacuum vent is provided in a eleventh barrel in order to recover volatile components.

Operating conditions are as follows.
Temperature set for cylinder barrels:
First barrel; 150° C.
Second barrel; 170° C.
Third barrel; 180° C.
Fourth barrel; 160° C.
Rotation speed of screw: 40 rpm The modified resin obtained in the above-mentioned manner was transferred from-the screw extruder for reaction to the screw extruder for incorporating the foaming agent. A feed rate of the modified resin was taken as 20 kg/h. The foaming agent was supplied through the side feeder to the extruder and dispersed in the resin. The foaming agent was azodicarbonamide (ADCA), and its feed rate was one kg/h.

A foamable resin composition thus obtained by kneading the modified resin with the foaming agent was discharged from the strand die, water-cooled and cut with the pelletizer to give pellets of the composition.
(3) Preparation of Composite Sheet The foamable resin composition in the above-mentioned manner was shaped into a sheet with a pressing machine. The shaping temperature was 180° C., the pressure was 200 kgf/cm$^2$, and the press molding was carried out for five minutes. A foamable sheet of 340 mm×340 mm×1 mm was obtained in this manner.

On the other hand, non-woven fabric made of polyethylene terephthalate ("Spanbond ekure 6301A" manufactured by Toyo Spinning Co., Ltd. , weighing: 30 g/m$^2$, tensile strength: vertically 1.6 kg/cm, horizontally 1.2 kg/cm) was laminated on both sides of the above-mentioned foamable sheet, and press molding was carried out under the above-mentioned condition again.

Edges were trimmed from the obtained foamable composite sheet to give a square sample having a side of 300 mm.

(4) Foaming

A stainless steel bat covered with talc was placed in a hot-air oven, the above-mentioned foamable sheet sample was put on the talc, and the sample was thermally foamed at 230° C. for about four minutes to give a composite foam.

EXAMPLE 2

A foamable composite sheet was obtained in the same manner as in Example 1 except that 0.75 part by weight of diphenylmethane bismaleimide was used as the modifying monomer to 100 parts by weight of polypropylene in the process for preparing the modified polyolefin resin (1), and this sheet was thermally foamed in the same manner to give a composite foam.

EXAMPLE 3

A foamable composite sheet was obtained in the same manner as in Example 1 except that 0.1 part by weight of divinylbenzene was used as the modifying monomer to 100 parts by weight of polypropylene and 0.03 part by weight of di-t-butylperoxide, which is an organic peroxide, was used to 100 parts by weight of polypropylene in the process for preparing the modified polyolefin resin (1), and this sheet was thermally foamed in the same manner to give a composite foam.

EXAMPLE 4

A foamable composite sheet was obtained in the same manner as in Example 1 except that 0.1 part by weight of triallyl isocyanurate was used as the modifying monomer to 100 parts by weight of polypropylene and 0.03 part by weight of di-t-butylperoxide, which is an organic peroxide, was used to 100 parts by weight of polypropylene in the process for preparing the modified polyolefin resin (1), and this sheet was thermally foamed in the same manner to give a composite foam.

EXAMPLE 5

A foamable composite sheet was obtained in the same manner as in Example 1 except that one part by weight of trimethylol propane triacrylate was used as the modifying monomer to 100 parts by weight of polypropylene in the process for preparing the modified polyolefin resin (1) and the press time was changed to 13 minutes in the process for preparing the composite sheet (3), and this sheet was thermally foamed in the same manner to give a composite foam.

EXAMPLE 6

A foamable composite sheet was obtained in the same manner as in Example 1 except that one part by weight of quinonedioxime was used to 100 parts by weight of polypropylene in the process for preparing the modified polyolefin resin (1), the modified resin and homo type polypropylene ("EA7" manufactured by Mitsubishi Chemical Industries, Ltd., MI; 1.2 g/10 minutes, density; 0.9 g/cm³) were supplied simultaneously at a rate of 10 kg/h respectively to the screw extruder for kneading the foaming agent, and the feed rate of the foaming agent was changed to one kg/h in the process for preparing the foamable resin composition (2), and this sheet was thermally foamed in the same manner to give a composite foam.

EXAMPLE 7

A foamable composite sheet was obtained in the same manner as in Example 6 except that the thickness of the foamable sheet was changed to 0.5 mm and non-woven fabric made of polyethylene terephtalate ("Spanbond ekure 6101A" manufactured by Toyo Spinning Co., Ltd., basis weight: 10 g/m², tensile strength: vertically 0.36 kg/cm, horizontally 0.18 kg/cm) was used as the sheet-like facing material in the process for preparing the composite sheet (3), and this sheet was thermally foamed in the same manner to give a composite foam.

EXAMPLE 8

A foamable composite sheet was obtained in the same manner as in Example 1 except that the thickness of the foamable sheet was changed to 0.5 mm and a rolled aluminium sheet (sample manufactured by Sumitomo Light Metal Co., Ltd.) was used as the sheet-like facing material in the process for preparing the composite sheet (3), and this sheet was thermally foamed in the same manner to give a composite foam.

COMPARATIVE EXAMPLE 1

The same procedure as in Example 1 was repeated except that the non-woven fabric was not laminated on the foamable sheet in the process for preparing the composite sheet (3), and the foamable sheet was thermally foamed in the same manner to give a foam.

COMPARATIVE EXAMPLE 2

The followings were used as raw materials for producing a foam.

High-density polyethylene ("JY20" manufactured by Mitsubishi Chemical Industries, Ltd., density; 0.951 g/cm³, MI; 9.0 g/10 minutes) 50 parts by weight Polypropylene ("MH8" manufactured by Mitsubishi Chemical Industries, Ltd., density; 0.900 g/cm³, MI; 0.30 g/10 minutes) 25 parts by weight Silane-modified polypropylene ("XPM800HM" manufactured by Mitsubishi Chemical Industries, Ltd., density; 0.912 g/cm³, MI; 11 g/10 minutes) 25 parts by weight Silane-crosslinking catalyst (masterbatch made of dibutyltin dilaurate, "PZ-10" manufactured by Mitsubishi Chemical Industries, Ltd.) 1.5 parts Thermally decomposable foaming agent (ADCA as with Example 1) 5 parts by weight A mixture comprising the above-mentioned five raw materials was supplied at a feed rate of 30 kg/h to the same twin screw extruder (Model "TEX44") as used in Example 1, the mixture was melted and kneaded at 180° C. and at a screw rotation speed of 60 rpm, and the kneaded product was extruded from a T die having a width of 350 mm and a lip divergence of 1.1 mm to give a sheet-like foamable molded material.

Then, a foamable composite sheet was obtained in the same manner as in the process for preparing the composite sheet (3) in Example 1. This foamable composite sheet was immersed in boiling water at 99° C. for two hours and water-crosslinked by boiling water cure. This foamable crosslinked composite sheet was thermally foamed in the same manner as in Example 1 to give a composite foam.

COMPARATIVE EXAMPLE 3

A foamable composite sheet was obtained in the same manner as in Comparative Example 2 except that the thickness of the foamable sheet was changed to 0.5 mm and non-woven fabric made of polyethylene terephthalate ("Spanbond ekure 6101A" manufactured by Toyo Spinning Co., Ltd., weighing: 10 g/m², tensile strength: vertically 0.36 kg/cm, horizontally 0.18 kg/cm) was used as the sheet-like facing material in the process for preparing the composite sheet (3). When this sheet was cured with boiling water and thermally foamed in the same manner, the non-woven fabric was broken during foaming, and the shape of the obtained foam was distorted extremely. Accordingly, evaluation of the foam mentioned later was carried out with respect to only an expansion ratio and a recycling property.

COMPARATIVE EXAMPLE 4

A foamable composite sheet was obtained in the same manner as in Comparative Example 2 except that the immersion time of boiling water cure was changed to 15 minutes. This sheet was thermally foamed in the same manner, but an expansion ratio was insufficient (limited to twice). Accordingly, evaluation of a foam mentioned later was not carried out.

PERFORMANCE EVALUATION

Performance of the composite foams obtained in the above-mentioned Examples and Comparative Examples was evaluated with respect to the following items.

Expansion ratio:
 After a sheet-like facing material was shaved off from the surface of the composite foam with a cutter, an expansion ratio of the foam was measured according to JIS K6767.

Compressive strength:
 The composite foam was cut into a cubic sample having a side of 5 cm, and 25% compressive strength of the sample was measured according to JIS K6767.

Flexural modulus:
 The composite foam was cut into a sample having length of 120 mm and a width of 25 mm, and the flexural modulus of the sample was measured according to JIS K7221.

Shape of cell (length of major axis/length of minor axis):
 The composite foam was cut in a direction of thickness, a cut section at the center in the direction of the thickness was observed with a optical microscope, and the length of major axis and the length of minor axis of a spindly foam cell were measured with a reference scale.

Recycling property: (flow property)
 After a sheet-like facing material was shaved off from the surface of the composite foam, the foam was compressed with a heating press to break cells, this foam was broken with a pelletizer into cubic pellets having a side of less than 6 mm, and its melt flow rate was measured under the condition 4 of JIS K7210.

Raw materials for producing foams of respective Examples and Comparative Examples and evaluation results of the obtained foams are summarized in Tables 1 to 3.

TABLE 1

|  | Example 1 | Example 2 | Example 3 | Example 4 | Example 5 |
|---|---|---|---|---|---|
| Polyolefin | PP | PP | PP | PE | PP |
| Monomer | QDO | DPMBM | DVB | TAIC | TMPTA |
| Organic peroxide | — | — | PBD | PBD | — |
| Unmodified resin to be blended | Absent | Absent | Absent | Absent | Absent |
| Sheet-like facing material | Non-woven fabric | Non-woven fabric | Non-woven fabric | Non-woven fabric | Non-woven fabric |
| Physical properties of composite foam |  |  |  |  |  |
| Expansion ratio (cc/g) | 14 | 12 | 9 | 10 | 14 |
| Compressive strength (kg/cm$^2$) | 8.7 | 10.2 | 9.8 | 8.8 | 8.7 |
| Flexural modulus (kg/cm$^2$) | 447 | 523 | 699 | 612 | 486 |
| Length of major axis/length of Minor axis (—) | 6.6 | 5.0 | 4.4 | 4.0 | 6.8 |
| Flow property (g/10 min.) | 1.6 | 1.5 | 0.9 | 1.0 | 0.6 |

TABLE 2

|  | Example 6 | Example 7 | Example 8 |
|---|---|---|---|
| Polyolefin | PP | PP | PP |
| Monomer | QDO | QDO | QDO |
| Organic peroxide | — | — | — |
| Unmodified resin to be blended | Present | Present | Absent |
| Sheet-like facing material | Non-woven fabric | Non-woven fabric (thin) | Rolled aluminum |
| Physical properties of composite foam |  |  |  |
| Expansion ratio (cc/g) | 13 | 13 | 10 |
| Compressive strength (kg/cm$^2$) | 15.0 | 14.4 | — |
| Flexural modulus (kg/cm$^2$) | 570 | 401 | 86,000 |
| Length of major axis/length of Minor axis (–) | 7.2 | 7.0 | 4.4 |
| Flow property (g/10 min.) | 1.9 | 1.9 | — |

TABLE 3

|  | Comparative Example 1 | Comparative Example 2 | Comparative Example 3 | Comparative Example 4 |
|---|---|---|---|---|
| Polyolefin | PP | Silane-modified PP | Silane-modified PP | Silane-modified PP |
| Monomer | QDO | — | — | — |
| Organic peroxide | — | — | — | — |
| Sheet-like facing material | — | Non-woven fabric | Non-woven fabric (thin) | Non-woven fabric |

TABLE 3-continued

|  | Comparative Example 1 | Comparative Example 2 | Comparative Example 3 | Comparative Example 4 |
|---|---|---|---|---|
| Physical properties of composite foam |  |  |  |  |
| Expansion ratio (cc/g) | 15 | 10 | 12 | 2 |
| Compressive strength (kg/cm$^2$) | 0.9 | 8.2 | — | — |
| Flexural modulus (kg/cm$^2$) | — | — | — | — |
| Length of major axis/length of Minor axis (—) | 1.0 | 2.5 | — | — |
| Flow property (g/10 min.) | 1.6 | <0.1 | <0.1 | — |

In the Tables,
PP: polypropylene
PE: polyethylene
QDO: p-quinonedioxime
DPMBM: diphenylmethane bismaleimide
DVB: divinylbenzene
PBD: di-t-butylperoxide
TAIC: triallyl isocyanurate
TMPTA: trimethylol propane triacrylate A composite foam of which cells are spindly and of which major axis is oriented in the direction of the thickness is obtained by foaming the foamable composite sheet of the polyolefin resin obtained by the process of the present invention. Accordingly, the compressive strength of the obtained foam is much higher than that of a conventional foam, the above-mentioned all defects of the prior art can be overcome, and the composite foam having the excellent performance can be produced efficiently and easily.

Since flowability is further improved by blending the unimodified polyolefin resin or other thermoplastic resin with the modified resin and the blowing pressure further decreases, spindly cells having more distortion than spheres are apt to be formed.

When the sheet-like facing material made of woven fabric, non-woven fabric, bictoria lawn or the like is used, the obtained composite foam becomes flexible in a bending direction in spite of a high compressive strength. When the sheet-like facing material comprising the metallic sheet is used, the obtained composite foam has a surface smoothness being equal to that of a conventional metallic composite board, and substantial lightening can be attained without causing practical strength shortage.

Industrial Applicability

The present invention relates to a process for producing a foamable composite sheet mainly composed of a polyolefin resin and to a composite foam obtained from this foamable composite sheet.

Since the composite foam according to the present invention is excellent in lightweight, thermal insulation properties, flexibility, etc., the foam is widely used for various thermal insulators, cushioning materials, floating materials, etc., and it can also be used for roof thermal insulators and floor thermal insulators of buildings, etc.

What is claimed is:

1. A process for producing a foamable composite polyolefin resin sheet, which comprises the steps of:
   reacting a polyolefin resin with 0.2 to 2 parts by weight per 100 parts by weight of the polyolefin resin of a modifying monomer to form a modified resin, the modifying monomer being a non-silane compound, having two or more functional groups which can undergo radical reaction, selected from the group consisting of a dioxime compound, a bismaleimide compound, divinylbenzene, an allylic polyfunctional monomer, a (meth)acrylic polyfunctional monomer and a quinine compound or a mixture thereof;
   blending with the obtained modified resin 50 to 200 parts by weight of an unmodified resin for every 100 parts by weight of the obtained modified resin;
   adding a thermally decomposable chemical foaming agent to the obtained modified resin blended with the unmodified resin to obtain a mixture;
   kneading the obtained mixture to obtain a foamable resin composition;
   shaping the obtained foamable resin composition into a foamable sheet; and
   laminating a plane of facing material on at least one side of the obtained foamable sheet, the facing material having a strength sufficient to inhibit the foamable sheet from expanding in in-plane directions during subsequent foaming by heating the foamable sheet.

2. A process for producing a polyolefin resin foam as claimed in claim 1, wherein the polyolefin resin is a polyethylene resin and/or a polypropylene resin.

3. A process for producing the foamable composite polyolefin resin sheet as claimed in claim 1, wherein 70 to 130 parts by weight of the unmodified polyolefin resin are blended with 100 parts by weight of the modified resin.

4. A process for producing the foamable composite polyolefin resin sheet as claimed in claim 1 or 2 wherein the sheet-like facing material is made of a material selected from the group consisting of glass cloth, woven fabric, non-woven fabric, victoria lawn, needle punched non-woven fabric, paper and a metallic sheet.

5. A composite foam obtained by thermally foaming the foamable composite sheet obtained by the process for producing the foamable composite polyolefin resin sheet as claimed in claim 1 or 2.

6. A process for producing a foamable composite polyolefin resin sheet, which comprises the steps of:
   reacting a polyolefin resin with 0.2 to 2 parts by weight per 100 parts by weight of the polyolefin resin of a modifying monomer which is a non-silane compound, together with an organic peroxide, to form a modified resin, the modifying monomer having two or more functional groups which can undergo radical reaction, selected from the group, consisting of a dioxime compound, a bismaleimide compound, divinylbenzene, an allylic polyfunctional monomer, a (meth)acrylic polyfunctional monomer and a quinine compound or a mixture thereof;

blending with the obtained modified resin 50 to 200 parts by weight of an unmodified resin for every 100 parts by weight of the obtained modified resin;

adding a thermally decomposable chemical foaming agent to the obtained modified resin blended with the unmodified resin to obtain a mixture;

kneading the obtained mixture to obtain a foamable resin composition;

shaping the obtained foamable resin composition into a foamable sheet; and laminating a plane of facing material on at least one side of the obtained foamable sheet, the facing material having a strength sufficient to inhibit the foamable sheet from expanding in in-plane directions during subsequent foaming by heating the foamable sheet.

7. A process for producing a polyolefin resin foam as claimed in claim 6, wherein said organic peroxide constitutes 0.005 to 0.15 parts by weight per 100 parts by weight of the polyolefin resin.

8. A process for producing a polyolefin resin foam as claimed in claim 6, wherein the polyolefin resin is a polyethylene resin and/or a polypropylene resin.

9. A process for producing a foamable composite polyolefin resin as claimed in claim 6, wherein the obtained modified resin is blended with an unmodified polyolefin resin of the same or different kind or other thermoplastic resin.

10. A process for producing a foamable composite polyolefin resin as claimed in claim 6, wherein 70 to 130 parts by weight of the unmodified polyolefin resin are blended with 100 parts by weight of the modified resin.

11. A process for producing a foamable composite polyolefin resin as claimed in claim 6, wherein the sheet-like facing material is made of a material selected from the group consisting of glass cloth, woven fabric, non-woven fabric, Victoria lawn, needle punched non-woven fabric, paper and a metallic sheet.

* * * * *